(12) United States Patent
Stuart et al.

(10) Patent No.: US 8,821,632 B2
(45) Date of Patent: Sep. 2, 2014

(54) AQUEOUS ASPHALT/WAX EMULSIONS FOR USE IN GYPSUM COMPOSITIONS AND BUILDING PRODUCTS

(75) Inventors: Jonathan T. Stuart, Lansdale, PA (US); William J. Werts, Glenolden, PA (US); Alexis M. Gonzalez, Springfield, PA (US)

(73) Assignee: Henry Company, LLC, El Segundo, CA (US)

( * ) Notice: Subject to any disclaimer, the term of this patent is extended or adjusted under 35 U.S.C. 154(b) by 0 days.

(21) Appl. No.: 13/585,719

(22) Filed: Aug. 14, 2012

(65) Prior Publication Data

US 2013/0042792 A1 Feb. 21, 2013

Related U.S. Application Data

(60) Provisional application No. 61/524,200, filed on Aug. 16, 2011, provisional application No. 61/587,822, filed on Jan. 18, 2012.

(51) Int. Cl.
*C04B 11/00* (2006.01)
*C04B 103/65* (2006.01)
*C04B 111/00* (2006.01)
*C04B 111/27* (2006.01)
*C04B 111/30* (2006.01)

(52) U.S. Cl.
CPC ............ *C04B 11/00* (2013.01); *C04B 2103/65* (2013.01); *C04B 2111/0062* (2013.01); *C04B 2111/27* (2013.01); *C04B 2111/30* (2013.01)
USPC ............................ 106/778; 106/271; 106/231

(58) Field of Classification Search
USPC .......................................... 106/231, 271, 778
See application file for complete search history.

(56) References Cited

U.S. PATENT DOCUMENTS

| | | | | |
|---|---|---|---|---|
| 2,432,963 A | * | 12/1947 | Camp | 106/660 |
| 3,935,021 A | * | 1/1976 | Greve et al. | 524/4 |
| 5,098,943 A | | 3/1992 | Tagawa et al. | |
| 5,120,355 A | * | 6/1992 | Imai | 106/2 |
| 5,437,722 A | | 8/1995 | Borenstein | |
| 5,695,553 A | * | 12/1997 | Claret et al. | 106/778 |
| 5,968,237 A | | 10/1999 | Sinnige | |
| 7,488,383 B2 | | 2/2009 | Donlon et al. | |
| 7,553,780 B2 | | 6/2009 | Smith | |
| 8,580,055 B2 | * | 11/2013 | Stuart et al. | 156/39 |
| 8,663,385 B2 | * | 3/2014 | Shoshani et al. | 106/778 |
| 2006/0196391 A1 | * | 9/2006 | Hassan et al. | 106/271 |
| 2010/0186870 A1 | | 7/2010 | Stuart et al. | |

OTHER PUBLICATIONS

International Search Report and Written Opinion for International Application No. PCT/US 12/50821, mailed on Oct. 10, 2012 in 17 pages.

* cited by examiner

*Primary Examiner* — David M Brunsman
(74) *Attorney, Agent, or Firm* — Knobbe Martens Olson & Bear, LLP

(57) ABSTRACT

Aqueous asphalt/wax emulsions are disclosed herein for use in gypsum formulations and other building products. The emulsions may include water; a wax component; an asphalt component; and at least one emulsifier. Optional additives may also be included in the emulsion or in a slurry formed from such emulsion for preparing a settable gypsum composition herein. Methods of making such emulsions are also provided.

55 Claims, 4 Drawing Sheets

AQUEOUS ASPHALT/WAX EMULSIONS FOR USE IN GYPSUM COMPOSITIONS AND BUILDING PRODUCTS

CROSS-REFERENCE TO RELATED APPLICATIONS

This application claims the benefit of priority under 35 U.S.C. §119(e) of U.S. Provisional Application No. 61/524,200 filed on Aug. 16, 2011, and entitled "AQUEOUS ASPHALT/WAX EMULSION FOR USE IN GYPSUM COMPOSITIONS AND BUILDING PRODUCTS," and U.S. Provisional Application No. 61/587,822 filed on Jan. 18, 2012, and entitled "AQUEOUS ASPHALT/WAX EMULSION FOR USE IN GYPSUM COMPOSITIONS AND BUILDING PRODUCTS," which are hereby incorporated herein by reference in their entirety and are to be considered a part of this specification.

BACKGROUND

1. Field

The invention relates to the field of wax emulsions and mixtures for addition to settable gypsum formulations and other construction and building formulations, and more particularly to the field of such mixtures and emulsions for making gypsum wallboards having low water absorption.

2. Description of the Related Art

Gypsum wallboard is used to form interior and exterior walls of buildings. Standard gypsum wallboard is made by preparing a gypsum slurry, positioning the slurry between two liners and allowing it to set. Standard wallboard formulations are not water resistant and lose strength when exposed to water. Furthermore, mildew, mold, or other biological growth can contaminate the wallboard if it is exposed to water.

Multiple attempts have been made to increase the water resistance of gypsum wallboard. One method includes adding an emulsion containing various compounds such as waxes, saponifying agents, emulsifiers, and other additives such as asphalt to a gypsum slurry.

U.S. Pat. No. 3,935,021 discloses adding an asphalt/wax emulsion with polyvinyl alcohol to a gypsum slurry to impart water-resistant properties. The asphalt/wax emulsion may include paraffin or microcrystalline wax in a ratio of about 1 part wax to 3 parts asphalt.

U.S. Pat. No. 4,094,694 discloses an asphalt/wax emulsion with polyvinyl alcohol and a borate compound added to a gypsum slurry to improve water-resistance. The wax may include paraffin or montan wax. U.S. Pat. No. 5,397,631 also describes an asphalt/wax emulsion with polyvinyl alcohol added to a gypsum slurry for improving the water-resistant properties. After the wallboard is formed, a coating of resin latex is added to further improve the water-resistant characteristics of the wallboard.

U.S. Pat. No. 5,437,722 describes a water-resistant gypsum composition and asphalt-free wax emulsion that includes a paraffinic hydrocarbon having a melting point of about 40° C. to 80° C., about 1 to 200 parts by weight montan wax per 100 parts of the paraffinic hydrocarbon, and about 1 to 50 parts by weight polyvinyl alcohol per 100 parts of the paraffinic hydrocarbon. Aqueous wax emulsions shown to be effective for improving the water-resistant properties of gypsum wallboard are also commercially available. One such commercial prior art aqueous emulsion is Aqualite® 70 provided by Henry Company, El Segundo, Calif. This emulsion has been shown to be very effective for increasing the moisture resistance of gypsum wallboard.

US Patent Publication No. 2010-0116406 A1 also teaches use of a synthetic montan-based formulation for use in water-resistant gypsum wallboard. Other effective commercial wax-based emulsions for use in gypsum wallboard include Aqualite® 30, Aqualite® 700 and Aqualite® 800 which are also provided by Henry Company.

While water-resistance can be achieved with the various emulsions described above, it would be desirable to achieve improved water resistant properties of gypsum wallboard, while lowering the cost of preparing such emulsions. Accordingly, there is a need in the art for compositions and methods that improve the water resistant properties of gypsum wallboard while reducing the costs of making such emulsions, particularly with respect to raw material costs.

SUMMARY

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

An example embodiment includes an asphalt/wax emulsion for use in a gypsum formulation includes no less than about 50 percent by weight water, about no less than 15 percent to about no more than 30 percent by weight of a wax component, the wax component may include a paraffinic hydrocarbon and one or more of a natural montan wax and a synthetic montan wax, about no less than 7 percent to about no more than 12 percent by weight of an asphalt component, the ratio of the asphalt component to the paraffinic hydrocarbon being in the range of between about 0.1:1 and about 1:1 by weight, and about no less than 1 percent to about no more than 5 percent by weight of at least one emulsifier.

According to another embodiment, an aqueous wax emulsion for use in a gypsum formulation includes about no less than 50 percent to about no more than 75 percent by weight of water, about no less than 10 percent to about no more than 40 percent by weight of a wax component, about no less than 5 percent to about no more than 15 percent by weight of an asphalt component, and about no less than 0.5 percent to about no more than 5 percent by weight of at least one emulsifier. In an embodiment, the emulsion may contain about 70 percent by weight of water, about 21 percent by weight of the wax component, about 8 percent by weight of the asphalt component, and about 1 percent by weight of the at least one emulsifier. In some embodiments, the wax component may be at least one of montan wax, a synthetic montan wax, and/or a paraffinic hydrocarbon. In some embodiments, the wax component may include a synthetic montan wax and the synthetic montan wax may be selected from the group consisting of a normal α-olefin wax, an olefin wax of a carbon chain length of about 20 or more carbon atoms that is modified by oxidizing and/or refining through distillation or stripping, natural or synthetic carnauba wax, palm wax, Fischer-Tropsch wax, bees wax, polyethylene wax, polymeric alkenes, oxidized polyethylene waxes, and mixtures, blends and derivatives thereof. The wax component may include a paraffinic hydrocarbon and the paraffinic hydrocarbon may be a paraffin wax having a melting point of about 40° C. to about 80° C. In some embodiments, the paraffin wax may include less than about 1 percent or less than 0.5 percent by weight oil. The emulsion may include about 0.5 to about 5 percent by weight of a montan wax, about 0.1 to about 5 percent by weight of a synthetic montan wax, and about 5 to about 30 percent by weight of a paraffinic hydrocarbon. In some embodiments, the emulsion includes about 1 to about 4 percent by weight of a montan wax, about 0.25 to about 3 percent by weight of a synthetic montan wax, and about 10 to about 30 percent by weight of a paraffinic hydrocarbon. In other embodiments, the emulsion may include about 1.5 to about 3 percent by weight of a montan wax, about 0.5 to about 1.5 percent by weight of a synthetic montan wax, and about 15 to about 25 percent by weight of a paraffinic hydrocarbon. In some embodiments, the emulsion includes about 2 percent by weight of a montan wax, about 1 percent by weight of a synthetic montan wax, and about 18 percent by weight of a paraffinic hydrocarbon. In some embodiments, the wax component includes a paraffinic hydrocarbon and a ratio of the asphalt component to the paraffinic hydrocarbon may be about 0.1:1 to about 1:1 by weight. In some embodiments, the ratio of the asphalt component to the paraffinic hydrocarbon may be about 0.4:1 by weight. In some embodiments the asphalt component may have a penetration grade less than about 60, less than about 20, or between about 0 and about 10. In some embodiments, the at least one emulsifier includes one or more of a hydrocarbon resin, a resin, a Kraft lignin, styrene maleic anhydride, and/or a polyolefin maleic grafted anhydride. In other embodiments, the resin may be one or more of a poly(phenolate carboxylate) resin, a thermoplastic resin, and blend thereof and the Kraft lignin may include a tall oil fatty acid based amidoamine and blends thereof. In some embodiments, the emulsion includes about 0.5 percent by weight of the poly(phenolate carboxylate) resin and about 0.6 percent by weight of the thermoplastic resin. In some embodiments, the at least one emulsifier may include styrene maleic acid and/or a polyolefin maleic grafted anhydride. The polyolefin maleic grafted anhydride may be polyethylene grafted maleic anhydride. The aqueous wax emulsion may also include a saponifying agent, wherein the emulsion may contain less than about 5 percent by weight of the saponifying agent. In some embodiments, the emulsion may include about 0.1 percent by weight to about 3 percent by weight of the saponifying agent or about 0.5 percent by weight of the saponifying agent. The saponifying agent may be an alkali metal. In some embodiments, the aqueous wax emulsion may also include a stabilizer and/or a dispersant.

Some embodiments further include methods of making an aqueous wax emulsion. One method of making an aqueous wax emulsion includes: a) providing a first emulsion component comprising asphalt and a wax component, wherein the asphalt component has a penetration grade less than about 60; b) providing a second emulsion component comprising water, and at least one emulsifier, c) heating each of the first and the second emulsion components; (d) combining the first emulsion component and the second emulsion component to form a emulsion solution; and (e) emulsifying the emulsion solution to form an aqueous wax emulsion. In a further embodiment, step (c) includes heating the components above about 70° C. The asphalt component preferably has a penetration grade of about 0 to about 10 and the wax component preferably includes at least one of montan wax, a synthetic montan wax, and/or a paraffin wax having less than about 1 percent by weight oil.

In another embodiment the method of making an aqueous wax emulsion includes: a) providing a complete asphalt emulsion, wherein the complete asphalt emulsion is made by providing a first emulsion component comprising asphalt, which in some embodiments may have a penetration grade less than about 60; providing a second emulsion component comprising water and at least one emulsifier; heating each of the first and second emulsion components; combining the first emulsion component and the second emulsion component to form a first emulsion solution; emulsifying the first emulsion solution to form a complete asphalt emulsion; b) providing a complete wax emulsion, wherein the complete wax emulsion is made by providing a third emulsion component comprising a wax component; providing a fourth emulsion component comprising water and at least one emulsifier; heating each of the third and fourth emulsion components; combining the third emulsion component and the fourth emulsion component to form a second emulsion solution; emulsifying the second emulsion solution to form a complete wax emulsion; c) combining the complete asphalt emulsion and the complete wax emulsion; and d) agitating the combined emulsion to form an aqueous wax emulsion. Although presented in sequential order for ease of understanding, a person of skill in the art will understand that the steps of the above methods may not need to be performed in the order listed.

A complete asphalt emulsion may be defined as an asphalt emulsion comprising at least an asphalt component, water, and at least one emulsifier. In some embodiments a complete asphalt emulsion may include any of the additives described herein.

A complete wax emulsion may be defined as a wax emulsion comprising at least a wax component, water, and at least one emulsifier. In some embodiments a complete wax emulsion may include any of the additives described herein.

Certain embodiments also include a settable gypsum composition with (a) a gypsum slurry, comprising water; and (b) an aqueous wax emulsion including no less than about 40 percent by weight water; about no less than 5 percent to no more than about 50 percent by weight of a wax component; about no less than 3 percent to no more than about 18 percent by weight of an asphalt component; and about no less than 0.2 percent to about no more than 10 percent by weight of at least one emulsifier. The asphalt component preferably has a penetration grade less than about 60 and the wax component is preferably at least one of montan wax, a synthetic montan wax, and/or a paraffin wax having less than about 1 percent by weight oil. The at least one emulsifier may include at least one resin, a Kraft lignin, SMA and/or a polyolefin grafted maleic anhydride. Optionally, the settable gypsum composition further includes an alkali metal.

DETAILED DESCRIPTION

Figure 1:
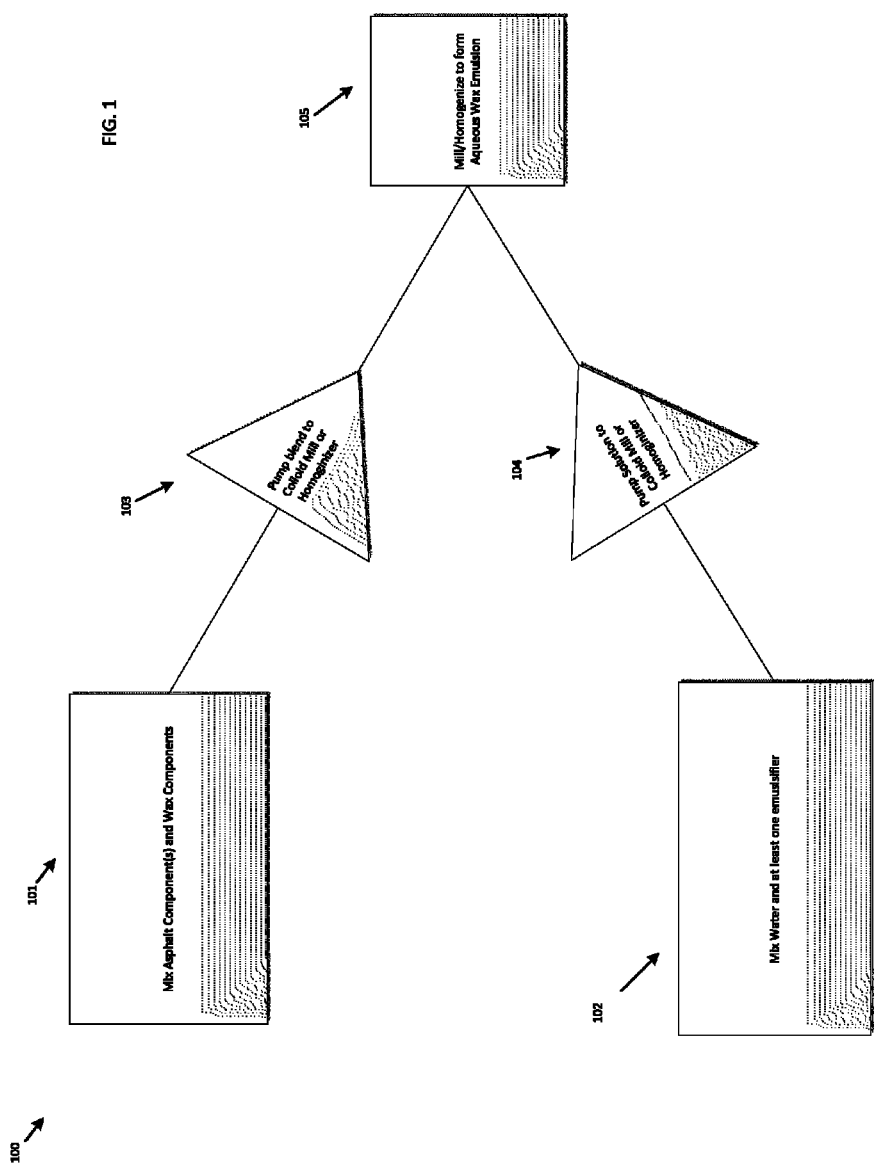
FIG. 1 illustrates an example process of one embodiment.

Certain embodiments of a composition described herein provide excellent water resistance and emulsion properties for use in a water-resistant gypsum wallboard as an additive, while at the same time reducing the cost of the emulsion by using relatively inexpensive asphalt. The emulsion also shows similar water-resistance properties compared with water-resistant, asphalt-free emulsions present in the art.

A significant component of an example aqueous asphalt/wax emulsions described herein is water. The water used to prepare the emulsion may include suitable industrial water, tap water, distilled or deionized water, or the like. The water is generally used in the emulsion in an amount of at least about 40 percent by weight, preferably about 50 percent by weight to about 75 percent by weight, more preferably about 60 percent by weight to about 70 percent by weight and even more preferably about 70 percent by weight of the emulsion. However, other embodiments may utilize higher or lower percentages, by weight, of water. For example, water may be used in the emulsion in an amount of at least about 50 percent by weight.

The example aqueous asphalt/wax emulsion further includes a wax component. The wax component may include one or more of a montan wax, a synthetic montan wax and/or a paraffinic hydrocarbon. In one embodiment, the wax component includes a combination of a paraffinic hydrocarbon and a montan wax. In another embodiment, the wax component includes at least some portion that includes a montan wax. In yet another embodiment, the wax component includes a montan wax which is at least partially substituted with a synthetic montan wax, wherein it will be understood that montan wax and/or synthetic montan wax can be used in varying combinations ranging from only one of these components to a blend in a ratio ranging from 1:99 to 99:1. The wax component makes up preferably about 5 to about 50 percent by weight of the emulsion, preferably about 10 to about 40 percent by weight of the emulsion, more preferably about 15 to about 30 percent by weight and even more preferably about 21 percent of the emulsion. However, other embodiments may utilize higher or lower percentages, by weight, of the wax component.

Montan wax, which is also known in the art as lignite wax, is a hard, naturally occurring wax that is typically dark to amber in color (although lighter, more refined montan waxes are also commercially available). Montan wax includes chemical components formed of long chain alkyl acids and alkyl esters having chain lengths of about 24 to 30 carbons. Natural montan includes resin acids, polyterpenes and some alcohol, ketone and other hydrocarbons such that it is not a "pure" wax. The saponification number of montan wax, which is a saponifiable wax, is about 92 and its melting point is about 80° C. The montan wax may also be bleached or refined. When using montan wax in the emulsion, it is preferably present in an amount of about 0.5 to about 5 percent by weight of the emulsion, preferably about 1 to about 4 percent by weight of the emulsion, more preferably about 1.5 to about 3 percent by weight of the emulsion, and even more preferably about 2 percent by weight of the emulsion. However, other embodiments may utilize higher or lower percentages, by weight, of montan wax.

Suitable synthetic montan wax which may be used in the wax component of the emulsion compositions herein include any synthetic montan wax known in the art or to be developed for use in aqueous wax emulsions. Synthetic montan waxes suitable for use include, but are not limited to the waxes described in U.S. Patent Application Publication No. 2010/0116406 which is incorporated herein in its entirety by reference. These synthetic montan waxes preferably are synthetic normal α-olefin waxes, synthetic olefin waxes of carbon chain lengths of about 20 or more carbon atoms that are preferably modified by oxidizing and/or by refining through distillation or stripping, and/or combinations thereof. Synthetic montan waxes may also include natural carnauba wax, palm wax, Fischer-Tropsch wax, bees wax, polyethylene wax, oxidized polyethylene wax, polymeric alkenes and their derivatives, siloxanes (with and without catalytic or other additives) useful as water-resistant wax formulation substitutes for preparing water-resistant gypsum wallboard, (see U.S. Pat. No. 7,892,472 for example, incorporated herein by reference in its entirety), coliphonium resin, synthetic carnauba wax and the like, either as individual components or in various blends with other synthetic montan materials. Such synthetic montan materials may also be combined with montan wax and/or paraffinic hydrocarbon. If used in the emulsions herein, synthetic montan wax is preferably present in an amount of up to about 5 percent by weight, preferably about 0.1 to about 5 percent by weight of the emulsion, more preferably about 0.25 to about 3 percent by weight of the emulsion, even more preferably about 0.5 to about 1.5 percent by weight of the emulsion, and even more preferably about 1 percent by weight of the emulsion. However, other embodiments may utilize higher or lower percentages, by weight, of synthetic montan wax.

Suitable paraffinic hydrocarbons for use include those known in the art or to be developed for use in aqueous wax emulsions useful for formation and improvement of the water resistant properties of gypsum wallboard and may include any suitable paraffinic hydrocarbon that is compatible with the other wax component(s), the asphalt component, and the at least one emulsifier. The paraffinic hydrocarbon is about 5 to about 40 percent by weight of the emulsion, preferably about 10 to about 30 percent by weight of the emulsion, more preferably about 15 to about 25 percent by weight of the emulsion, and even more preferably about 18 percent by weight of the emulsion. However, other embodiments may utilize higher or lower percentages, by weight, of paraffinic hydrocarbon. For example, the paraffinic hydrocarbon may make up about 5 percent to about 30 percent by weight of the emulsion. The paraffinic hydrocarbon is preferably a paraffin wax having a melting point of about 40° C. to about 80° C., which properties are favorable for water-resistant wallboard manufacture, although for other building products applications such as for oriented strand board, other paraffin waxes may be used as well.

Paraffin wax is classified based on the quantity of entrapped oil removed from the wax during the refining process. The classifications of paraffin wax include fully-refined wax having less than about 0.5 percent by weight oil, semi-refined wax having about 0.5 percent by weight to about 1 percent by weight oil and scale wax which has greater than 1 percent oil. The paraffin wax may be a semi-refined paraffin wax having less than about 1 percent by weight oil and more preferably a fully refined wax having less than 0.5 percent by weight oil. Paraffin waxes with low oil content are preferred because they are more compatible with gypsum wallboard. Higher oil content paraffins can cause the gypsum wallboard to defoam and increase in density.

In some embodiments, the wax emulsion further includes a hydrocarbon compound or compounds, which may include a hydrocarbon resin. Hydrocarbons or hydrocarbon compounds may be one or more of a class of materials which are hydrocarbon compounds or resins formed therefrom (natural and synthetic). The hydrocarbon compounds may be saturated or unsaturated compounds which may have various optional functionalized groups or may be nonfunctionalized. By "functionality" as used herein, a group may be naturally present or synthesized to be added on the compound through reaction, grafting or other chemical procedures. Some examples of functional groups include carboxylic acid groups; sulfur-containing groups; sulfur-containing groups;

mercapto groups; carboxyl groups; hydroxyl groups; phenolic groups; nitrogen-containing groups such as amines and the like; ketones; aldehydes; acrylates; aliphatic, aromatic or alicyclic alcohols; fluorinated groups, and alkylated, alkenylated, alkynylated, arylated, or similar side-chain groups which may be further functionalized by the other groups noted above. In some embodiments, functionality may be attached to a carbon in the chain, but atoms or molecules may also be introduced into the chain or structure, for example, nitroso groups, esters, ethers and the like.

In some embodiments, the hydrocarbon compounds can be used in the monomeric form or can be in dimerized, trimerized, oligomerized form or in a resin form, either natural or synthetic which is made from such compounds. In some embodiments, compounds and resins may be further derivatized if desired by a user to provide compatibility, reactivity or other properties. The resins may have a molecular weight (Mw) of no greater than 3,000 and preferably less than 2,000 and even more preferably of about 500 to about 1,000. In some embodiments, compounds or resins as used in the hydrocarbon component may be one single compound or resin, or a mixture, blend or alloy of two or more such compounds and/or resins.

In some embodiments, the hydrocarbon may have from 5 to 20 carbon atoms or at least one hydrocarbon resin which is based on the at least one hydrocarbon compound as a monomer, wherein the resin is at least a dimmer comprising the hydrocarbon compound and the resin may have a Mw of no greater than about 3,000, wherein the hydrocarbon compound is saturated or unsaturated, functionalized or nonfunctionalized and is aliphatic, alicyclic, or aromatic. In some embodiments the hydrocarbon may have a softening point of from about 22° C. to about 110° C. In other embodiments, the hydrocarbon compound may have a softening temperature of about 65° C. to about 110° C.

Non-limiting examples of hydrocarbon compounds include aromatic petroleum hydrocarbon resin formed by aromatic petroleum distillate products and having a molecular weight of about 1,000 or less and a softening point of about 90° C. to about 100° C. and phenol-functionalized resins, acid-functionalized resins, and esters thereof. Commercially available example compounds in this group include various Novares® resins from Rütgers Chemicals GmbH in Germany formed from petroleum steam-creaked distillates, Akron alicyclic hydrocarbon resins from Arakawa Chemicals, and similar compounds. Further, in some embodiments one may use aromatic hydrocarbon compounds or resins taken from a petroleum distillate fraction of C5 to C9 components, having softening points of about 75° C. to about 105° C. as well as phenol-modified compounds and resins, acid-modified compounds and resins, and esters thereof. Some examples of commercially available compounds are available under the trade names Hikotack® P-90 from Kolon Industries in Korea, Norsolene® M1090 and Wingtack® 86, both available from Cray Valley in France, Escorez® 2101 and similar compounds such as Novares methylstryenated phenols.

In other embodiments, other resins which may be used in the hydrocarbon component include terpene resins and terpene phenolic resins such as those available from Arizona Chemical under the name Sylvatec®, and rosin, rosin esters, pentaerythritol-containing rosins, pentaerythritol-containing rosin esters, and acid-modified rosins, acid-modified resins, or pentaerythritol-containing resins esters such as those sold under the name Novares® from Rütgers Chemicals GmbH and Sylvalite® from Arizona Chemical. The hydrocarbon component, in some embodiments, may also include aliphatic and alicyclic hydrocarbon resins with softening points from about 95° C. to about 105° C., for example, those available from Struktol Co as well as under the name Akron which are available from Arakawa Chemical. Coumarone-indene resins having a softening point of about 20° C. to about 100° C. may also be used. Examples of such resins are available under the name Novares® from Rütgers Chemical GmbH. Further, alkyl-, alkynl-, or aryl-functionalized naphthalene esters, such as, for example, diisopropyl naphthalene ester in liquid form available as Novares® H-1100 from Rütgers Chemical GmbH and various other alicyclic compounds such as phenols, terpenes, indenes, naphthas, napthalenes and alkyl-, alkenyl-alkynl-, aryl-functionalized compounds thereof may also be used in the hydrocarbon component.

Other examples of commercially available hydrocarbon resins may include SCS-D from Specialty Chemicals Sales, S-85 from Norsolene, N-TT90 from Rutgers, Sun-Tack Taipei, and Aqualite® 70. Hydrocarbon resins, as described herein include a single type of hydrocarbon resin or mixtures of more than one type of hydrocarbon resin. In some embodiments, a hydrocarbon resin, if used, may not be soluble in water or may be nearly insoluble in water.

In some embodiments, a hydrocarbon resin, if used may comprise between about 0.5% and about 10.0% by weight of the emulsion based on the total weight of the emulsion. Preferably, hydrocarbon resin (if used) comprises between about 1.0% and about 10.0% by weight based on the total weight of the emulsion. More preferably, hydrocarbon resin (if used) comprises between about 2.0% and about 6.0% by weight of the emulsion, based on the total weight of the emulsion. However, other embodiments may utilize higher or lower percentages, by weight, of hydrocarbon resin.

The wax emulsion further includes an asphalt component which provides improved water resistance properties to the gypsum wallboard. An example embodiment of the asphalt-based emulsion imparts similar water repellant properties to the gypsum wallboard compared with the asphalt-free emulsions present in the art. Further, the asphalt component is generally less expensive when compared with other emulsion components. Accordingly, certain embodiments of the aqueous asphalt/wax emulsions may generally be less expensive to manufacture generally due to raw material costs when compared with asphalt-free emulsions that require higher amounts of more expensive components to contribute to water-repellant properties.

Asphalt for use herein may be generally a black, sticky, semi-solid material with high viscosity at room temperature. It is classified into several grades, depending primarily on its hardness. The "penetration grade" of the asphalt is an index showing the hardness of the asphalt. The penetration grade is determined by penetrating a probe into the asphalt at a temperature of 25° C. under a predetermined load and time. The penetration grade corresponds to the depth of the probe penetrating the asphalt in 0.1 mm units when the probe is pressed with a force of 100 g for 5 seconds. Accordingly, the smaller the penetration grade, the harder the asphalt.

The asphalt component may include any asphalt known in the art or to be developed for use in aqueous wax emulsions useful for formation of gypsum wallboard. The asphalt component preferably has a penetration grade less than about 60. In a more preferred embodiment, the asphalt component has a penetration grade less than about 40, and more preferably less than about 20. In a more preferred embodiment, the asphalt component is a "zero penetration" or "zero-pen" asphalt with a penetration grade of about 0 to about 10.

The asphalt component is about 3 to about 18 percent by weight of the emulsion, preferably about 5 to about 15 percent by weight of the emulsion, more preferably about 7 to about 12 percent by weight of the emulsion and even more preferably about 8 percent by weight of the emulsion. In a preferred embodiment, the ratio of the asphalt component to the paraffinic hydrocarbon is about 0.1:1 to about 1:1 by weight. In a more preferred embodiment, the ratio of the asphalt component to the paraffinic hydrocarbon is about 0.4:1 by weight. Other ratios may be used as well.

Certain embodiments of the aqueous wax emulsions further include at least one emulsifier. Examples of emulsifiers which could be used include any emulsifier known in the art or to be developed which is suitable for use in an asphalt/wax aqueous emulsion. The at least one emulsifier may be selected from anionic, slow-setting emulsifiers compatible with asphalt. Non-limiting examples of such emulsifiers include a hydrocarbon resin and/or a Kraft lignin and even more preferably a poly(phenolate carboxylate) resin, a thermoplastic resin, a tall oil fatty acid based amidoamine or blends thereof. Poly(phenolate carboxylate) resin is commercially available from MeadWestvaco Corporation, Charleston, S.C. as INDULIN® ISE. The INDULIN® ISE resin is an anionic, slow-setting, asphalt emulsifier. A thermoplastic resin suitable for use with the aqueous wax emulsion is VINSOL® resin commercially available from Pinova, Brunswick, Ga. VINSOL® resin is a hard, brittle, dark-colored thermoplastic natural resin derived from pine wood. It contains about 57% phenolic fractions, about 28% rosin fractions, and about 15% terpenoid fractions and may be used as an asphalt emulsifier. The VINSOL® resin is also readily saponifiable in a basic medium such as an alkali metal hydroxide or an alkaline earth hydroxide. Accordingly, VINSOL® resin mixed with an alkali metal hydroxide such as potassium hydroxide is also suitable for use. A tall oil fatty acid based amidoamine suitable for use is INDULIN® SAL commercially available from MeadWestvaco Corporation, Charleston, S.C.

In another embodiment the at least one emulsifier may be selected from SMA and/or polyolefin grafted maleic anhydrides. SMA may be obtained by the copolymerization of styrene and maleic anhydride, and its molecular weight may be from 800 to 100,000. In certain embodiments the molecular weight of SMA may be from 1,000 to 50,000.

Such a copolymer may be used also in the form of a derivative such as a partial ester of an organic monohydroxy compound. Partial esterification may be conducted after the reaction of styrene with the maleic anhydride. Otherwise, it may be conducted by the reaction of a partial ester of maleic anhydride with styrene. In certain embodiments the molar ratio of styrene to maleic anhydride or its partial ester is within a range of from 1:1 to 1:5. Suitable examples of SMA may include SMA® 1000 produced by Sartomer, and/or Xiran SZ 40005 produced by Polyscope Polymers B.V.

The organic monohydroxy compound to be used for forming the partial ester, may be an alcohol such as methanol, ethanol, isopropanol, butanol, or 2-ethylhexanol, or a cellosolve such as butyl cellosolve or ethyl cellosolve. In certain embodiments the organic monohydroxy compound is used in an amount of about 1 mol per mol of maleic anhydride.

The polyolefin grafted maleic anhydride may comprise at least one maleic anhydride moiety grafted onto a polyolefin backbone. The graft polymer acts as an emulsifier. The polyolefin backbone may have carbon chain lengths in the range of about 5- to about 500 carbon atoms. These carbon chains may be both linear and/or branched, and further may be saturated or unsaturated. In certain embodiments the polyolefin grafted maleic anhydride is polyethylene grafted maleic anhydride.

The polyolefin maleic grafted anhydride may be further reacted with other compounds such as amines and esters for form derivatives of the polyolefin maleic graphed anhydride. These resultant derivatives may include polyimides, polyamines, polyacids, polysalts, polyesters and combinations thereof.

It is contemplated that a wide variety of polyolefin maleic grafted anhydrides may be utilized in the present composition. Examples of suitable polyolefin maleic grafted anhydrides may include Ceramer® 5005 and Ceramer® 67 grafted polymers produced by Baker Petrolite, although others are available.

In some embodiments, the at least one emulsifier may be a waxy emulsifier. In certain embodiments waxy emulsifiers may include montan wax (or alternative natural or synthetic alternative) or hydrocarbon (C9-type) resins, further details of which have been disclosed elsewhere in this application. In some embodiments, the waxy emulsifiers may not be soluble in water or may be nearly insoluble in water. In additional embodiments the emulsifier may be a liquid emulsifier. In some embodiments liquid emulsifiers may include PE-MA, Vinsol® soap, Indulin ISE and other surfactants, such as those known to the industry.

Each of these emulsifiers described above may be used alone in the aqueous asphalt/wax emulsion. However, blends of the emulsifiers have shown improved emulsifying properties and are therefore preferred.

The at least one emulsifier is about 0.2 to about 10 percent by weight of the aqueous wax emulsion, preferably about 0.25 percent by weight to about 10 percent by weight, more preferably about 0.5 to about 5 percent by weight of the emulsion, even more preferably about 1 to about 3 percent by weight of the emulsion, and even more preferably about 1 percent by weight of the emulsion. In some embodiments, the at least one emulsifier may comprise no less than 1 percent to about no more than 5% by weight of the emulsion. In a preferred embodiment, the poly(phenolate carboxylate) resin is about 0.5 percent by weight of the emulsion and the thermoplastic resin is about 0.6 percent by weight of the emulsion. In another preferred embodiment, the emulsion includes about 1 to about 50 parts by weight of the at least one emulsifier per 100 parts by the combined weight of the paraffinic hydrocarbon and the asphalt component.

Also useful in an aqueous wax emulsion according to an embodiment herein is a saponifying agent(s) which may include alkali metals, preferably potassium hydroxide, ammonium hydroxide, magnesium sulfate, sodium hydroxide or a similar material, and even more preferably potassium hydroxide. Other saponifying agents known or to be developed for use in wax emulsions may be used as well. Saponifying agents may be present in an amount less than about 5 percent by weight of the emulsion, preferably about 0.1 to about 3 percent by weight of the emulsion, and even more preferably about 0.5 percent by weight of the emulsion.

Optional stabilizers and/or dispersants of types known in the art may be used if desired in preferred embodiments of the aqueous wax emulsions described herein. Preferably, if a stabilizer is used, the stabilizer is polyvinyl alcohol or a similar material that can enhance water resistance in wallboard. The polyvinyl alcohol preferably is prepared by hydrolysis of polyvinyl acetate and is more preferably a substantially completely or fully hydrolyzed polyvinyl alcohol. Even more preferably it is at least about 90% hydrolyzed polyvinyl alcohol, and more preferably 97% to 100% hydrolyzed polyvinyl alcohol. Even more preferably the polyvinyl alcohols used are soluble in water at elevated temperatures of about 60° C. to about 95° C., but are insoluble in cold water. The polyvinyl alcohol is an optional component, because although it can enhance water resistance, it does contribute to increasing cost of the overall emulsion components.

Preferred optional dispersants, include, but are not limited to those having a sulfur or a sulfur-containing group(s) in the compound such as sulfonic acids (R—S(=O)$_2$—OH) and their salts, wherein the R groups may be otherwise functionalized with hydroxyl, carboxyl or other useful bonding groups. Preferred are higher molecular weight sulfonic acid compounds such as lignosulfonic acid, naphthalene sulfonic acid, the sulfonate salts of these acids and derivatized or functionalized versions of these materials. A preferred lignosulfonic acid salt is Polyfon® H available from MeadWestvaco Corporation, Charleston, S.C. In addition, other dispersants known in the art for use in wax emulsions, such as magnesium sulfate; ammonium hepta molybdate/starch combinations; non-ionic surfactants, ionic surfactants, zwitterionic surfactants and mixtures thereof; and alkyl quaternary ammonium montmorillonite clay as well as other known dispersants may be used. Similar materials may also be used herein, provided they are compatible with and perform well with the formulation components.

In some embodiments, certain components may be only added in negligible amounts or may be excluded entirely. For example, according to some embodiments, an alkali metal salt of a condensation product of β-naphthalene sulfonic acid with formalin and/or an alkali salt of polyacrylic acid may be only added in negligible amounts or excluded entirely. In other embodiments, a cationic surfactant, for example, a quaternary amine surfactant, may be only added in negligible amounts or may be excluded from the formulation entirely. According to some embodiments synthetic and/or natural montan wax may only be added in negligible amounts or excluded entirely. According to some embodiments borate may only be added in negligible amounts or excluded entirely.

Other additives may be provided, such as those conventionally employed in emulsions for different purposes including emulsifiers to assist in formation of the emulsion, including useful materials that are known or to be developed to assist in stabilization of the emulsion, rheological agents, thickeners, compatibilizers, colorants, fillers, preservatives, surfactants and the like.

Methods of Manufacture

A method of making an aqueous wax emulsion herein in one embodiment includes providing a separate emulsion components, preferably heated, and combining the heated components to form an emulsion solution, which is emulsified to form an aqueous wax emulsion.

For a general understanding of an example embodiment of a method 100 of making the composition of the disclosure, reference is made to the flow diagram in FIG. 1. As shown in 101, the asphalt component(s) and wax component(s) may be mixed in an appropriate device to form a blend. Then, as shown in 103, the blend may be pumped to a colloid mill or homogenizer. As demonstrated in 102, in a separate step, water and at least one emulsifier are mixed. Then the water and at least one emulsifier solution are pumped into a colloid mill or homogenizer as shown in 104. Steps 101 and 102 may be performed simultaneously, or they may be performed at different times. Steps 103 and 104 may be performed at the same time, so as to ensure proper formation of droplets in the emulsion. In some embodiments, steps 101 and 103 may be performed before step 102 is started. Finally, as shown in 105, the blend from 101 and the solution from 102 are milled or homogenized in the same colloid mill or homogenizer to form an aqueous wax emulsion.

Figure 2:
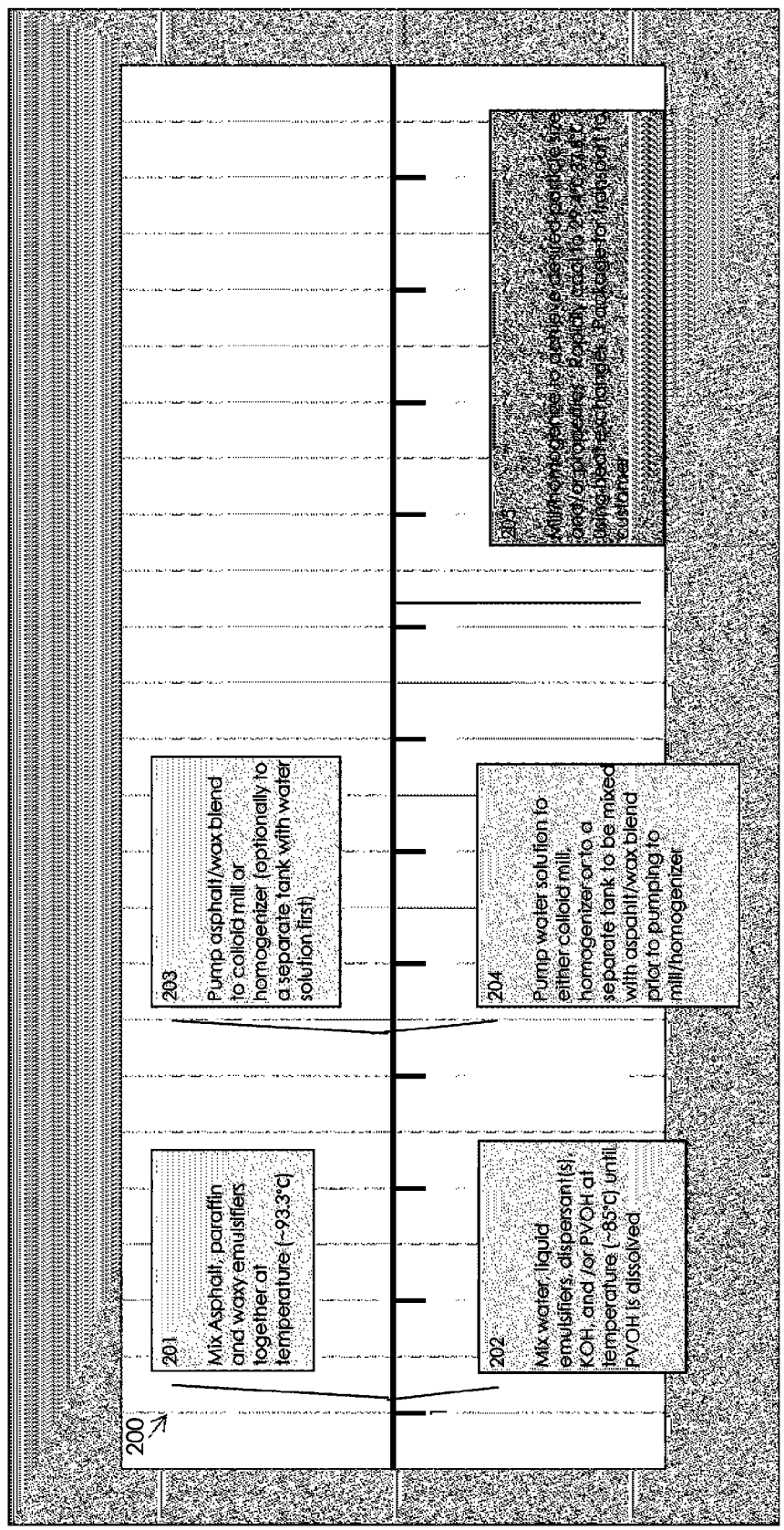
FIG. 2 illustrates an example process of a second embodiment.

The flow diagram of FIG. 2, illustrates yet another example method 200 of forming an aqueous asphalt wax emulsion using a single emulsion approach. As shown in 201, the asphalt component(s), paraffin wax, and appropriate emulsifiers (such as waxy emulsifiers such as a water-insoluble hydrocarbon resin) are mixed together at a temperature of about 93.3° C. to form an asphalt/wax blend. Then, as shown in 203, the asphalt/wax blend may be pumped to a colloid mill or homogenizer. Simultaneously, or at an earlier or later time, as shown in 202 water, liquid emulsifiers, dispersant(s), KOH and/or polyvinyl alcohol may be mixed at a temperature of about 85° C. until the polyvinyl alcohol is dissolved to form a water solution. Then, as illustrated by 204 the water solution may be pumped to a colloid mill or a homogenizer. In some embodiments, the asphalt/wax blend may be pumped first to a separate tank with the water solution first before they are pumped to the colloid mill or homogenizer. Then, as shown in 205, the blend from 203 and the water solution from 204 may be milled or homogenized together to achieve the desired particle size and/or properties of an asphalt/wax emulsion. The emulsion may then be rapidly cooled to a temperature in the range of between about 29.4° C. and about 37.8° C. using a heat exchanger. The resulting cooled wax/asphalt emulsion may then be packaged for transport to a customer.

In another embodiment, a first emulsion component preferably includes an asphalt as described herein, preferably one with a penetration grade of less than about 60, and a wax component, wherein the wax component may be made up of the various waxes suitable for a wax component in the emulsion compositions described hereinabove.

According to some embodiments, the wax component may be prepared according to the following example method. Paraffin wax may be heated above its melting point to form molten paraffin wax. Hydrocarbon resin may be melted and added to the molten paraffin wax in some embodiments. In some embodiments, other waxes may be incorporated into the molten paraffin and, optionally, synthetic waxes or natural waxes may be added to form the wax component. For example, montan wax may be melted and incorporated with the molten paraffin wax to form the wax component. In some embodiments, melted hydrocarbon resin may also be added to the wax component as a waxy emulsifier to form the first emulsion component.

A second emulsion component is then provided which includes water, and at least one emulsifier, for example, the emulsifiers described herein, preferably a blend of such emulsifiers. Other additives (surfactants, dispersants, etc.) may also be provided to the second emulsion component. It is most preferred that prior to combining the two emulsion components, each is heated to about the same temperature (although variations in temperature are acceptable). While heating may occur after combination, it is more preferred that at least some heating occurs prior to combination of the emulsion components to avoid separation and facilitate homogeneity. The two emulsion components may be combined using milling or homogenized mixing techniques. Any such techniques known in the art or to be developed maybe used, such as, for example, passing the components through a colloid mill.

Alternatively, a homogenizer may be used instead of a colloid mill. Such homogenizers may be the same general type of equipment used to homogenize milk and other products. In such a method, the first and second combined emulsion components are fed together under high pressure (typically about 1500 psi to about 3500 psi) to emulsify the components and create a smaller particle size than is typically associated with use of a colloid mill. The emulsion may also readily be reformed by agitation, in the event that emulsified components of the emulsion separate on storage.

The solution is combined, with further heating if needed, and the emulsion solution undergoes an emulsification reaction to form an aqueous wax emulsion for use, for example, in gypsum wallboard.

In an embodiment, the asphalt component as described hereinabove preferably having a penetration grade less than about 60 and more preferably having a penetration grade of about 0 to about 10, the wax component as described above preferably has one or more of montan wax, a hydrocarbon resin, a synthetic montan wax and/or a paraffin wax, wherein it is further preferred that the paraffin wax has less than about 1 percent by weight oil. Alkali metals, optional stabilizers, such as polyvinyl alcohol and the like are preferably added in the second emulsion component as described hereinabove may also be provided as well as any of the other additives noted herein. Preferably also, the first and second emulsion components are both heated to above about 70° C. prior to mixing/homogenizing the components for emulsification.

In another embodiment, a method of making an aqueous wax emulsion herein includes providing a complete asphalt emulsion and a complete wax emulsion, and combining the complete emulsions to form an aqueous wax emulsion solution.

Figure 3:
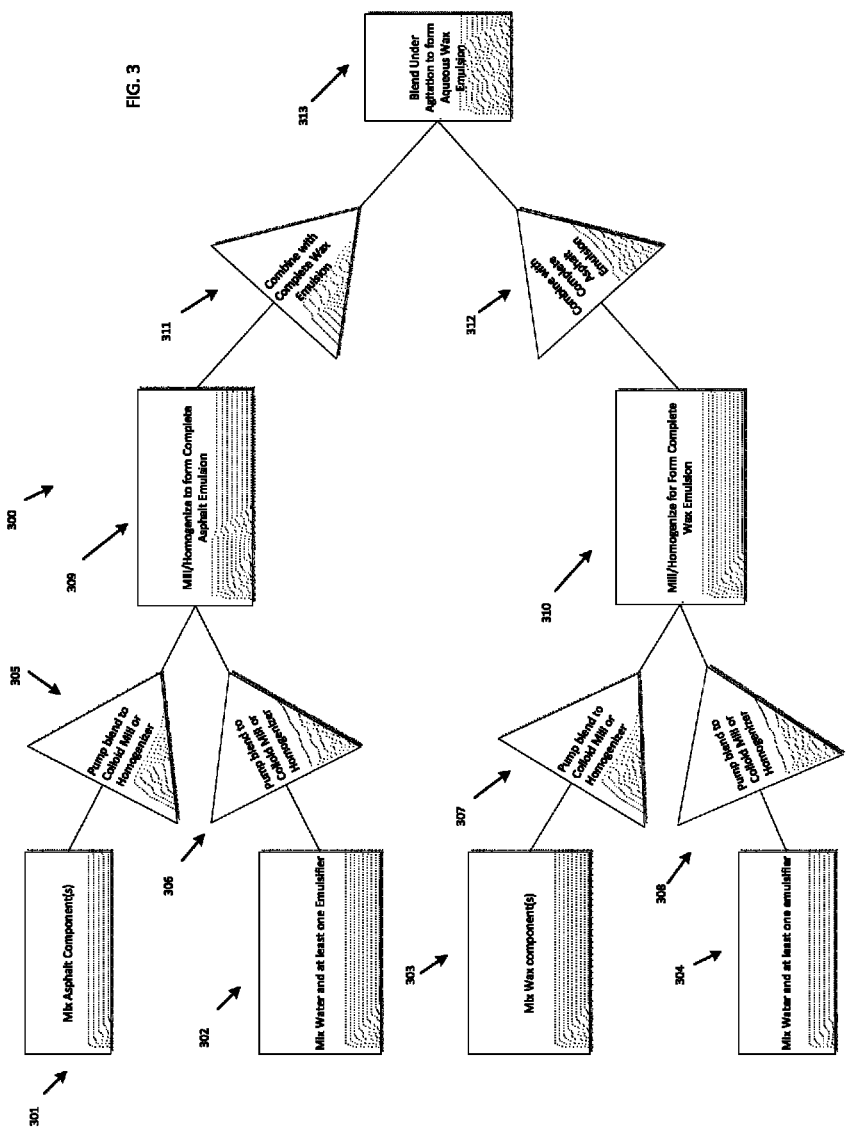
FIG. 3 illustrates an example process of a third embodiment.

For a general understanding of yet another example embodiment of the method 300 of making the composition of the disclosure, reference is made to the flow diagram in FIG. 3. As shown in 301, the asphalt components may be mixed in an appropriate device. The asphalt components blend may then be pumped to a colloid mill or homogenizer as shown in 305. Simultaneously, or at an earlier or later time, as shown in 302, water and at least one emulsifier may be mixed into a blend, then, as shown in 306, pumped to the same colloid mill or homogenizer as the asphalt components blend mixed in 301. Then the asphalt component blend formed in 301 and the water/emulsifier blend formed in 302 may be milled or homogenized together to form a complete asphalt emulsion as shown in 309. As demonstrated in 303, in a separate step, wax component(s) may be mixed to form a wax component(s) blend. The wax component(s) blend may then be pumped to a colloid mill or homogenizer as shown in 307. Simultaneously, or at an earlier or later time, as shown in 304, water and at least one emulsifier may be mixed into a blend, then, as shown in 308, pumped to the same colloid mill or homogenizer as the wax component(s) blend mixed in 303. Then the wax component(s) blend formed in 303 and the water/emulsifier blend formed in 304 may be milled or homogenized together to form a complete wax emulsion as shown in 310. As shown in 311 and 312, the complete asphalt emulsion may be combined with the complete wax emulsion. As shown in 313, the two emulsions may be blended under agitation to form an aqueous wax emulsion.

Figure 4:
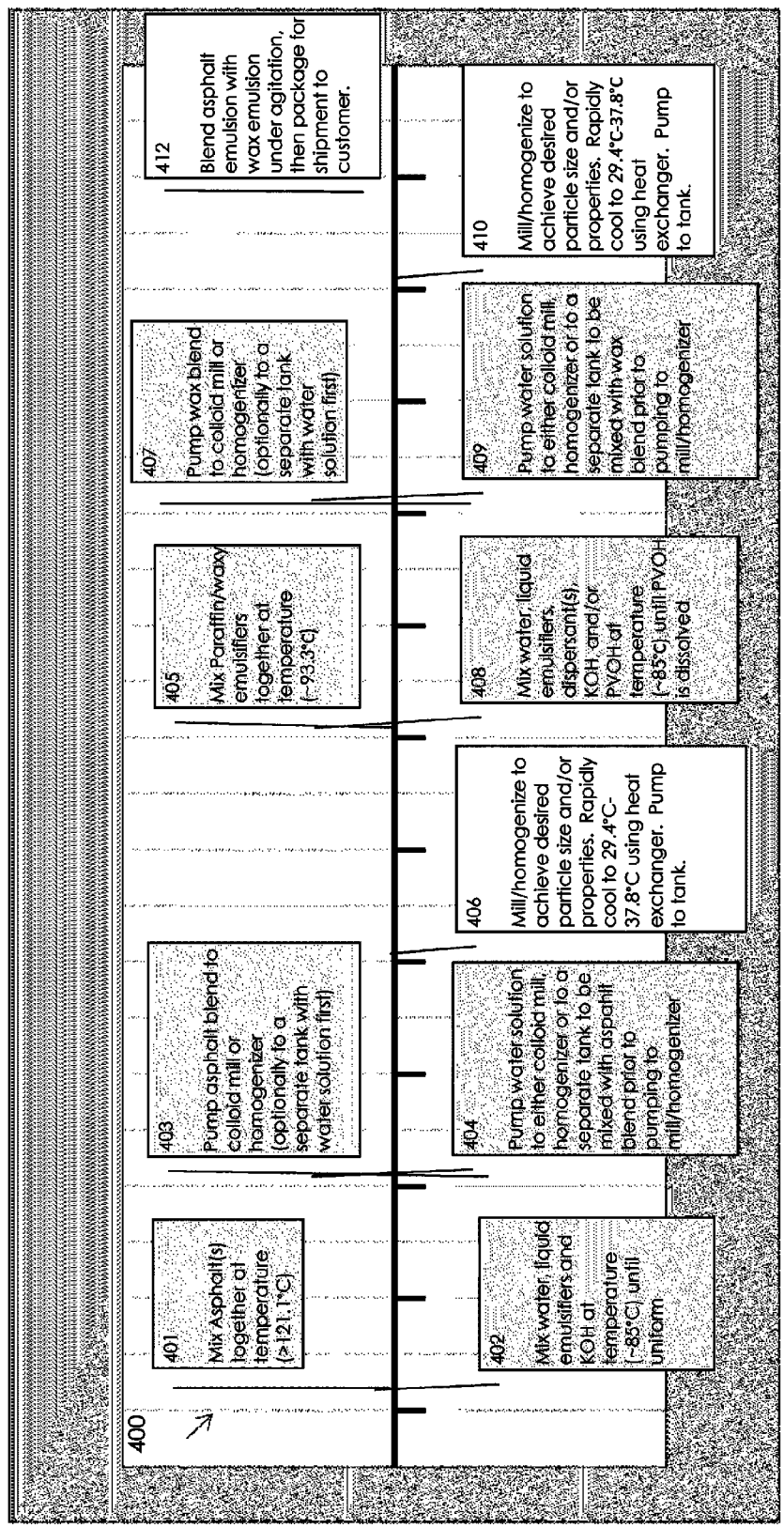
FIG. 4 illustrates an example process of a fourth embodiment.

The flow diagram of FIG. 4, illustrates yet another example method 400 of forming an aqueous asphalt wax emulsion using a dual emulsion approach. As shown in 401, the asphalt components may be mixed in an appropriate device at a temperature of about 121.1° C. The asphalt components blend may then be pumped to a colloid mill or homogenizer as shown in 403. Simultaneously, or at an earlier or later time, as shown in 402, water, liquid emulsifiers, and KOH may be mixed into a blend at a temperature of about 85° C. until uniform to form a water solution. Then, as shown in 404, the water solution may be pumped into a colloid mill or a homogenizer with the asphalt blend formed in 401. In some embodiments, the asphalt blend may be pumped to a separate tank with the water solution formed in 402 before the mixture is pumped to a colloid mill or homogenizer. Then the asphalt blend formed in 401 and the water solution formed in 402 may be milled or homogenized together to achieve a desired particle size and/or properties and rapidly cooled to a temperature between about 29.4° C. and about 37.8° C. using a heat exchanger to form a complete asphalt emulsion, then pumped to a tank as shown in 406. As demonstrated in 405, in a separate step, paraffin wax and waxy emulsifiers (such as synthetic or natural montan wax or hydrocarbon resin) may be mixed together at a temperature of about 93.3° C. to form a wax blend. The wax blend may then be pumped to a colloid mill or homogenizer as shown in 407. Simultaneously, or at an earlier or later time, as shown in 408, water, liquid emulsifiers, dispersant(s), KOH and/or polyvinyl alcohol may be mixed at a temperature of about 85° C. until the polyvinyl alcohol (if used) is dissolved to form a water solution. Then, as shown in 409, the water solution may be pumped into a colloid mill or a homogenizer with the wax blend formed in 405. In some embodiments, the wax blend may be pumped to a separate tank with the water solution formed in 408 before the wax blend and water solution are pumped to a colloid mill or homogenizer. Then the wax blend formed in 405 and the water solution formed in 408 may be milled or homogenized together to achieve a desired particle size and/or properties and rapidly cooled to a temperature between about 29.4° C. and about 37.8° C. using a heat exchanger to form a complete wax emulsion as shown in 410, then pumped to a tank to be combined with the complete asphalt emulsion formed in 406. As shown in 412, the complete asphalt emulsion formed in 406 may be blended under agitation with the complete wax emulsion formed in 410 in a tank to form a completed asphalt/wax emulsion. The complete asphalt/wax emulsion may then be packaged for shipment to a customer.

A complete asphalt emulsion is provided, wherein the complete asphalt emulsion is made using the following method. A first emulsion component is provided which includes asphalt. In certain embodiments the first emulsion component is heated to about 120° C. or higher, although other temperatures may be used. A second emulsion component is provided which includes water and at least one emulsifier, for example, the emulsifiers described herein, preferably a blend of such emulsifiers. Other additives (surfactants, dispersants, and other additives as described hereinabove) may also be provided to the second emulsion component. In some embodiments the second emulsion component is heated to about 85° C., although other temperatures may be used. The first emulsion component and second emulsion component may be combined using milling or homogenized mixing techniques. Any techniques known in the art or to be developed may be used, such as, for example, passing the components through a colloid mill. Alternatively to or in addition to a colloid mill, a homogenizer may be used. Such homogenizers may be of the same type described hereinabove.

A complete wax emulsion is provided, wherein the complete wax emulsion is made using the following example method. A third emulsion component is provided which includes a wax component, wherein the wax component may be made up of the various waxes suitable for a wax component in the emulsion compositions described hereinabove. The third emulsion component may also include at least one emulsifier, which may include a hydrocarbon resin. In certain embodiments the third emulsion component is heated to about 90° C., although other temperatures may be used. A fourth emulsion component is provided which includes water, and at least one emulsifier, for example, the emulsifiers described herein, preferably a blend of such emulsifiers. Other additives (surfactants, dispersants, and other additives as described hereinabove) may also be provided to the fourth emulsion component. In certain embodiments the fourth emulsion component is heated to about 85° C., although other temperatures may be used. The third emulsion component and the fourth emulsion component may be combined using milling and/or homogenized mixing techniques, as described hereinabove.

The complete asphalt emulsion and the complete wax emulsion are then combined, under agitation, and the combined emulsion solution to form an aqueous wax emulsion for use, for example, in gypsum wallboard.

In certain embodiments, the asphalt component of the complete asphalt emulsion as described hereinabove may have a penetration grade less than about 60 or a penetration grade of about 0 to about 10, the wax component of the complete wax emulsion as described above, may have one or more of montan wax, a synthetic montan wax and/or a paraffin wax, wherein, in some embodiments, the paraffin wax has less than about 1 percent by weight oil. In other embodiments alkali metals, optional stabilizers, such as polyvinyl alcohol and the like may be added in the second emulsion component and/or the fourth emulsion component as described hereinabove may also be provided, as well as any of the other additives noted herein.

Settable Gypsum Compositions

A settable gypsum composition is also described herein which includes a gypsum slurry and the aqueous asphalt/wax emulsions described above. The aqueous asphalt/wax emulsion preferably includes water; a wax component preferably including at least one of a montan wax, a synthetic montan wax, and/or a paraffin wax having less than about 1 percent by weight oil; an asphalt component preferably having a penetration grade less than 60; and at least one emulsifier preferably a hydrocarbon resin or Kraft lignin. An optional saponifying agent, preferably an alkali metal, may also be included.

The gypsum composition may optionally include a dispersant described above (for example, lignosulfonic acid, naphthalene sulfonic acid or combinations thereof) which may be added to the emulsion and/or the gypsum slurry. Various strength additives and/or wettability additives known or to be developed in the art may be provided to the slurry as optional components. Thus, the gypsum formulation may include at least a first strength additive(s), that includes a vinyl acetate/ethylene copolymer(s) in latex or emulsion form (added singularly or in combination) and a second additive which is one or more of a wetting agent and/or a surfactant. The wetting agents and/or surfactants can be chosen from materials including: fatty alcohols, ethoxylated alcohols, vegetable oil ethoxylates, alkyl phenol ethoxylates, monobasic esters, silicone polyethers, alkylated pyrrolidones, asphaltene dispersants, acetylenic diols, EO/PO block copolymers, polyethylene glycols, polyethylene glycol (PEG) esters, alkylbenzenesulfonic acids, alkylbenzene sulfonate, sodium, potassium and amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants. The wetting agents and/or surfactants can be used independently or in blends of more than one material. The combination of the first and second additives provides a gypsum product, such as a gypsum wallboard having enhanced strength for the gypsum formulation and better adhesion of the calcium-based components within the gypsum core, thus providing enhanced strength throughout the thickness of the board.

EXAMPLES

Illustrative aqueous asphalt/wax emulsions now are described with respect to the following non-limiting examples.

In this example, aqueous asphalt/wax emulsions were formed along with lab-sized gypsum boards using such emulsions for testing. The, liquids such as water and the aqueous asphalt/wax emulsion and any other additives, were place in a Waring® industrial kitchen blender. The quantity of aqueous wax emulsion added to the blender was sufficient to form wallboard having either about 44 pounds (lbs) or about 70 lbs of aqueous wax emulsion per thousand square feet (MSF) of wallboard. Stucco was then mixed with starch and accelerator (BMA—ball mill accelerator). The stucco was allowed to soak in the liquids for about 10 seconds then the blender was turned to medium speed for about 15 seconds. The resulting slurries were poured into a form with paper to produce a 12"×12" initial set and moved to an oven set at 170° C. After 18 minutes, the boards were flipped and dried for an additional 18 minutes. Following which, the boards were dried at 43° C. for 24 hours. A 6"×6" sample was then taken from the middle of the boards. After cooling to room temperature, the boards tested to determine their moisture resistance.

The moisture resistance of the 6"×6" boards was then measured pursuant to ASTM C473. Each 6"×6" board was weighed, soaked in water for 2 hours, and then reweighed. The moisture resistance of each board was calculated as the percent increase in the weight of the board after soak. Thus, a board with higher moisture resistance is less water resistant than a board with lower moisture resistance.

Two control samples were tested based on commercial emulsion Aqualite® 70 at 44-lbs/MSF and 70-lbs/MSF for comparative purposes. Tables 1 and 2 shows the 44-lbs/MSF control sample compared to various 44-lbs/MSF samples and associated moisture resistance results. Table 3 illustrates the composition of various other 70-lbs/MSF samples containing hydrocarbon resin and associated moisture resistance and viscosity results. Table 4 shows the 70-lbs/MSF control sample compared to various 70-lbs/MSF samples and associated moisture resistance results. The various aqueous asphalt/wax emulsion components and associated percent by weight in the emulsion are also shown in the tables. The type of gypsum used was a standard wallboard manufactured according to ASTM C1936. The starch used was a commercial starch, Wallboard Binder, Industrial Starch-Modified from Tate & Lyle.

TABLE 1

| Component | Control | A | B | C | D | E | F | G | H | I | J | K | L | M |
|---|---|---|---|---|---|---|---|---|---|---|---|---|---|---|
| Saponifying Agent (potassium hydroxide (KOH)) | 0.53 | 0.5 | 0.5 | 0.5 | 0.5 | 0.5 | 0.5 | 0.5 | 0.5 | 0.5 | 0.5 | 0.5 | 0.5 | 0.5 |
| Emulsifier (VINSOL ® resin in 15% solution with KOH) | 0 | 0 | 0 | 0 | 0 | 0 | 0 | 0.58 | 0.6 | 0.6 | 0 | 0 | 0 | 0 |
| Emulsifier (INDULIN ® ISE) | 0 | 0 | 0 | 0 | 0 | 0 | 0 | 0.5 | 0.5 | 0.5 | 0 | 0 | 0.7 | 0.7 |
| Stabilizer (polyvinyl alcohol) | 2.00 | 1.01 | 1.01 | 0.5 | 2 | 2.02 | 2.02 | 0 | 0 | 0 | 2 | 2 | 2 | 0 |

TABLE 1-continued

| Component | Control | A | B | C | D | E | F | G | H | I | J | K | L | M |
|---|---|---|---|---|---|---|---|---|---|---|---|---|---|---|
| Water | 60.07 | 72.06 | 72.06 | 72.56 | 70 | 71.05 | 71.05 | 70.7 | 70.7 | 70.7 | 70 | 70 | 69.3 | 71.3 |
| Dispersant (Polyfon ® H) | 0.42 | 0 | 0 | 0 | 0 | 0 | 0 | 0 | 0 | 0 | 0 | 0 | 0 | 0 |
| Montan Wax | 3.00 | 3.04 | 0 | 0 | 3 | 3.04 | 3.04 | 3.02 | 1.5 | 1.5 | 3 | 0 | 3 | 3 |
| Synthetic Montan Wax | 0 | 0 | 3.04 | 3.04 | 0 | 0 | 0 | 0 | 0 | 0 | 0 | 3 | 0 | 0 |
| Asphalt Component (zero-penetration) | 0 | 5.79 | 5.79 | 5.79 | 11.70 | 5.85 | 17.54 | 7.1 | 7.2 | 8.6 | 0 | 0 | 0 | 0 |
| Asphalt Component (40-60 penetration) | 0 | 0 | 0 | 0 | 0 | 0 | 0 | 0 | 0 | 0 | 7 | 7 | 7 | 7 |
| Paraffinic hydrocarbon (Paraffin Wax) | 33.98 | 17.6 | 17.6 | 17.6 | 11.70 | 17.54 | 5.85 | 17.6 | 19 | 17.6 | 17.5 | 17.5 | 17.5 | 17.5 |
| Moisture Resistance (%) | 6.41 | 20.83 | 23.38 | 30.65 | 55.13 | 21.53 | 36.12 | 5.32 | 33.17 | 32.07 | 12.87 | 11.11 | 14.22 | 17.6 |

The table values correspond to the weight percent of each emulsion component unless otherwise specified.

TABLE 2

| Component | Control | AA | AB | AC | AD | AE | AF | AG | AH | AI | AJ | AK |
|---|---|---|---|---|---|---|---|---|---|---|---|---|
| Saponifying Agent (potassium hydroxide (KOH)) | 0.53 | 0.5 | 0.5 | 0.5 | 0.5 | 0.5 | 0.5 | 0.5 | 0.5 | 0.5 | 0.5 | 0.5 |
| Emulsifier (VINSOL ® resin in 15% solution with KOH) | 0 | 1.85 | 1.1 | 0.6 | 0.6 | 0.6 | 1.85 | 0.6 | 0 | 0 | 0 | 3 |
| Emulsifier (INDULIN ® ISE) | 0 | 1.52 | 0.92 | 0.5 | 0.5 | 0.5 | 1.52 | 0.5 | 0 | 6.3 | 3.4 | 0 |
| Water | 60.07 | 70.23 | 69.29 | 70.17 | 70.17 | 70.09 | 69.09 | 69.03 | 70.22 | 70.22 | 70.22 | 70.22 |
| Dispersant (Polyfon ® H) | 0.42 | 0 | 0 | 0 | 0 | 0 | 1.2 | 1.2 | 0 | 0 | 0 | 0 |
| Montan Wax | 3.00 | 3.17 | 3.03 | 2.73 | 2.42 | 2.19 | 3.17 | 2.73 | 6.06 | 2.2 | 3.03 | 0 |
| Synthetic Montan Wax | 0 | 0.87 | 0 | 0.3 | 0.61 | 0.92 | 0.87 | 0.3 | 2.94 | 0 | 2.07 | 0 |
| Asphalt Component (zero-penetration) | 0 | 4.26 | 8.5 | 7.6 | 7.6 | 7.6 | 4.26 | 7.6 | 2.68 | 2.68 | 2.68 | 8.68 |
| Paraffinic hydrocarbon (Paraffin Wax) | 33.98 | 17.6 | 16.66 | 17.6 | 17.6 | 17.6 | 17.6 | 17.6 | 17.6 | 17.6 | 17.6 | 17.6 |
| Moisture Resistance (%) | 6.41 | 14.87 | 12.2 | 14.28 | 13.05 | 14.22 | 20.54 | 13.14 | 14.06 | 7.19 | 7.44 | 8.94 |

| Component | AL | AM | AN | AO | AP | AQ | AR | AS | AT | AU | AV |
|---|---|---|---|---|---|---|---|---|---|---|---|
| Saponifying Agent (potassium hydroxide (KOH)) | 0.5 | 0.5 | 0.5 | 0.5 | 0.5 | 0.5 | 0.5 | 0.5 | 0.5 | 0.5 | 0.5 |
| Emulsifier (VINSOL ® resin in 15% solution with KOH) | 2.94 | 5.1 | 8 | 5.47 | 0 | 2.2 | 0 | 2.94 | 0 | 8 | 8 |
| Emulsifier (INDULIN ® ISE) | 0 | 3.9 | 1 | 0 | 6.8 | 6.8 | 2.94 | 0 | 4.9 | 0 | 0 |
| Water | 70.22 | 70.22 | 70.22 | 70.22 | 70.22 | 70.22 | 70.22 | 70.22 | 70.22 | 70.22 | 70.22 |
| Dispersant (Polyfon ® H) | 0 | 0 | 0 | 0 | 0 | 0 | 0 | 0 | 0 | 0 | 0 |
| Montan Wax | 6.06 | 0 | 0 | 3.53 | 2.2 | 0 | 0 | 0 | 0 | 0 | 0 |
| Synthetic Montan Wax | 0 | 0 | 0 | 0 | 0 | 0 | 6.06 | 6.06 | 0 | 1 | 1 |
| Asphalt Component (zero-penetration) | 2.68 | 2.68 | 2.68 | 2.68 | 2.68 | 2.68 | 2.68 | 2.68 | 6.78 | 2.68 | 2.68 |
| Paraffinic hydrocarbon (Paraffin Wax) | 17.6 | 17.6 | 17.6 | 17.6 | 17.6 | 17.6 | 17.6 | 17.6 | 17.6 | 17.6 | 17.6 |
| Moisture Resistance (%) | 5.68 | 7.47 | 9.84 | 7.14 | 5.95 | 6.11 | 6.83 | 7.4 | 6.73 | 9.77 | 8.93 |

The table values correspond to the weight percent of each emulsion component unless otherwise specified.

TABLE 3

| Component | BA | BB | BC | BD | BE | BF | BG | BH | BI | BJ | BK | BL |
|---|---|---|---|---|---|---|---|---|---|---|---|---|
| Saponifying Agent (potassium hydroxide (KOH)) | 0.28 | 0.28 | 0.28 | 0.28 | 0.28 | 0.28 | 0.28 | 0.28 | 0.30 | 0.30 | 0.30 | 0.30 |

TABLE 3-continued

| | | | | | | | | | | | | |
|---|---|---|---|---|---|---|---|---|---|---|---|---|
| Emulsifier (VINSOL ® resin in 15% solution with KOH) | 0.56 | 0.45 | 0.60 | 1.85 | 0.60 | 1.35 | 1.00 | 1.35 | 1.35 | 1.85 | 1.35 | 1.35 |
| Hydrocarbon Resin (Hikotack P90) | 2.25 | 2.25 | 2.25 | 2.25 | 2.25 | 2.25 | 2.25 | 2.25 | 2.25 | 2.25 | 2.75 | 2.25 |
| Water | 67.60 | 67.71 | 70.09 | 67.97 | 68.89 | 68.47 | 68.47 | 68.47 | 69.00 | 68.85 | 68.00 | 68.50 |
| Dispersant (Polyfon ® H) | 0 | 0 | 0 | 1.2 | 0 | 1.20 | 1.45 | 1.20 | 1.20 | 1.2 | 1.50 | 1.50 |
| Montan Wax | 0.84 | 0.84 | 0.84 | 0.84 | 0.84 | 0.84 | 0.84 | 0.0 | 0.84 | 0.84 | 0.84 | 0.84 |
| Asphalt Component (zero-penetration) | 10.56 | 10.56 | 8.50 | 8.50 | 8.50 | 8.50 | 8.50 | 8.50 | 8.50 | 8.50 | 8.50 | 9.00 |
| Paraffinic hydrocarbon (Paraffin Wax) | 16.19 | 16.19 | 16.19 | 16.19 | 16.19 | 16.19 | 16.19 | 17.03 | 16.19 | 16.19 | 16.19 | 16.19 |
| Moisture Resistance (%) | 15.72 | 16.03 | 15.84 | 10.54 | 16.00 | 8.93 | 18.31 | 20.00 | 7.35 | 7.65 | 7.36 | 6.24 |
| Viscosity (cps) | 24 | 24 | 24 | 28 | 28 | 28 | 28 | 24 | 28 | 28 | 28 | 24 |

| Component | BM | BN | BO | BP | BQ | BR | BS | BT | BU | BV | BW |
|---|---|---|---|---|---|---|---|---|---|---|---|
| Saponifying Agent (potassium hydroxide (KOH)) | 0.30 | 0.30 | 0.30 | 0.30 | 0.40 | 0.40 | 0.40 | 0.40 | 0.40 | 0.40 | 0.40 |
| Emulsifier (VINSOL ® resin in 15% solution with KOH) | 1.35 | 1.85 | 1.85 | 1.35 | 1.85 | 1.85 | 1.85 | 1.85 | 1.85 | 1.85 | 1.35 |
| Hydrocarbon Resin (Hikotack P90) | 2.25 | 2.25 | 2.25 | 2.25 | 2.75 | 3.25 | 2.75 | 2.75 | 2.75 | 2.25 | 2.75 |
| Water | 68.40 | 68.00 | 67.60 | 69.00 | 65.97 | 65.47 | 65.47 | 65.66 | 66.57 | 65.97 | 66.57 |
| Dispersant (Polyfon ® H) | 1.20 | 1.20 | 1.20 | 1.20 | 1.20 | 1.20 | 1.20 | 1.20 | 1.20 | 1.20 | 1.20 |
| Montan Wax | 1.44 | 0.84 | 1.44 | 0.84 | 1.44 | 1.44 | 1.44 | 1.75 | 0.84 | 1.44 | 0.84 |
| Asphalt Component (zero-penetration) | 8.50 | 9.00 | 9.00 | 8.50 | 9.00 | 9.00 | 9.50 | 9.00 | 9.00 | 9.50 | 9.50 |
| Paraffinic hydrocarbon (Paraffin Wax) | 16.19 | 16.19 | 16.19 | 16.19 | 16.19 | 16.19 | 16.19 | 16.19 | 16.19 | 16.19 | 16.19 |
| Moisture Resistance (%) | 7.70 | 6.87 | 12.83 | 7.30 | 6.78 | 7.20 | 7.35 | 7.20 | 8.13 | 8.32 | 7.33 |
| Viscosity (cps) | 28 | 28 | 28 | 28 | 24 | 24 | 24 | 24 | 24 | 24 | 24 |

The table values correspond to the weight percent of each emulsion component unless otherwise specified.

TABLE 4

| Component | Control | CA | CB | CC | CD | CE | CF | CG | CH | CI | CJ |
|---|---|---|---|---|---|---|---|---|---|---|---|
| Saponifying Agent (potassium hydroxide (KOH)) | 0.53 | 0.5 | 0.5 | 0.5 | 0.5 | 0.5 | 0.5 | 0.5 | 0.5 | 0.5 | 0.5 |
| Emulsifier (VINSOL ® resin in 15% solution with KOH) | 0 | 1.85 | 1.1 | 0.6 | 0.6 | 0.6 | 1.85 | 0.6 | 1.1 | 0.6 | 1.85 |
| Emulsifier (INDULINE ® SAL) | 0 | 0 | 0 | 0 | 0 | 0 | 0 | 0 | 0.92 | 0.5 | 1.52 |
| Emulsifier (INDULINE ® ISE) | 0 | 1.52 | 0.92 | 0.5 | 0.5 | 0.5 | 1.52 | 0.5 | 0 | 0 | 0 |
| Water | 60.07 | 70.23 | 69.29 | 70.17 | 70.17 | 70.09 | 69.03 | 68.90 | 69.29 | 70.17 | 69.03 |
| Dispersant (Polyfon ® H) | 0.42 | 0 | 0 | 0 | 0 | 0 | 1.2 | 1.2 | 0 | 0 | 1.2 |
| Montan Wax | 3.00 | 3.17 | 3.03 | 2.73 | 2.42 | 2.19 | 3.17 | 2.73 | 3.03 | 2.73 | 3.17 |
| Synthetic Montan Wax | 0 | 0.87 | 0 | 0.3 | 0.61 | 0.92 | 0.87 | 0.3 | 0 | 0.3 | 0.87 |

TABLE 4-continued

| | | | | | | | | | | |
|---|---|---|---|---|---|---|---|---|---|---|
| Asphalt Component (zero-penetration) | 0 | 4.26 | 8.5 | 7.6 | 7.6 | 7.6 | 4.26 | 7.6 | 8.5 | 7.6 | 4.26 |
| Paraffinic hydrocarbon (Paraffin Wax) | 33.98 | 17.6 | 16.66 | 17.6 | 17.6 | 17.6 | 17.6 | 17.6 | 16.66 | 17.6 | 17.6 |
| Moisture Resistance (%) | 4.5 | 6.55 | 7 | 5.47 | 8.39 | 4.11 | 5.14 | 6.12 | 4.8 | 4.75 | 5.16 |

| Component | CK | CL | CM | CN | CO | CP | CQ | CR | CS | CT |
|---|---|---|---|---|---|---|---|---|---|---|
| Saponifying Agent (potassium hydroxide (KOH)) | 0.5 | 0.5 | 0.5 | 0.5 | 0.5 | 0.5 | 0.5 | 0.5 | 0.5 | 0.5 |
| Emulsifier (VINSOL ® resin in 15% solution with KOH) | 0.6 | 0.6 | 0.6 | 0.6 | 0.6 | 0.6 | 0.6 | 0.6 | 0.6 | 0.6 |
| Emulsifier (INDULINE ® SAL) | 0.5 | 0.5 | 0.5 | 0.5 | 0.5 | 0.5 | 0.5 | 0.5 | 0.5 | 0.5 |
| Emulsifier (INDULINE ® ISE) | 0 | 0 | 0 | 0 | 0 | 0 | 0 | 0 | 0 | 0 |
| Water | 70.09 | 69.49 | 68.89 | 70.09 | 69.49 | 68.89 | 70.09 | 70.09 | 70.17 | 70.09 |
| Dispersant (Polyfon ® H) | 0 | 0.6 | 1.2 | 0 | 0.6 | 1.2 | 0 | 0 | 0 | 0 |
| Montan Wax | 2.19 | 2.19 | 2.19 | 3.11 | 3.11 | 3.11 | 2.19 | 3.11 | 2.73 | 3.11 |
| Synthetic Montan Wax | 0.92 | 0.92 | 0.92 | 0 | 0 | 0 | 0.92 | 0 | 0.3 | 0 |
| Asphalt Component (zero-penetration) | 7.6 | 7.6 | 7.6 | 7.6 | 7.6 | 7.6 | 7.6 | 7.6 | 7.6 | 7.6 |
| Paraffinic hydrocarbon (Paraffin Wax) | 17.6 | 17.6 | 17.6 | 17.6 | 17.6 | 17.6 | 17.6 | 17.6 | 17.6 | 17.6 |
| Moisture Resistance (%) | 9.55 | 7.34 | 8.26 | 8.9 | 7.52 | 7.9 | 6.83 | 6.81 | 7.22 | 8.17 |

The table values correspond to the weight percent of each emulsion component unless otherwise specified.

Surprisingly, it was found that in some samples, including, but not limited to, formulation G, having 7.1 wt % 0-pen asphalt and 17.6 wt % paraffinic hydrocarbon wax, and formulation AL, having 2.68 wt % 0-pen asphalt and 17.6 wt % paraffinic hydrocarbon wax, and formulation CE, having 7.6 wt % 0-pen asphalt and 17.6 wt % paraffinic hydrocarbon wax, the moisture resistance of the samples were each less than that of the control sample, which does not contain an asphalt component.

In a second example, an aqueous asphalt/wax emulsion was formed for water resistance evaluation using the ASTM C473 method described above. Water was heated to about 98.9° C. KOH was added to the water and Vinsol® was dissolved in the solution. Upon dissolution of the Vinsol, SMA and Indulin® ISE were added and the solution was mixed until uniform. Asphalt was heated separately until fluid. Montan wax, synthetic montan wax, and molten paraffin were added to the fluid asphalt and mixed until uniform. The asphalt/wax blend was mixed into the water blend and milled with a colloid mill. Moisture resistance, using National Gypsum Burlington Stucco and the ASTM C473 testing method described above, was found to be 7%. Table 5 shows an example formulation

TABLE 5

| Component | Amount (%) |
|---|---|
| Saponifying Agent (potassium hydroxide (KOH)) | 0.28 |
| Montan Wax | 0.84 |
| Paraffinic Hydrocarbon (Paraffin Wax (fully refined)) | 16.19 |
| Synthetic Montan Wax | 1.13 |
| Asphalt Component (0-penetration) | 10.56 |
| SMA1000MA | 1.13 |
| Emulsifier (Vinsol ® resin) | 0.01 |
| Emulsifier (Indulin ® ISE) | 0.56 |
| Water | 69.3 |

The table values correspond to the weight percent of each emulsion component unless otherwise specified.

In a third example, an aqueous asphalt/wax emulsion was formed for water resistance evaluation using the ASTM C473 method described above. In the third example a complete asphalt emulsion was formed using the following method. Water was heated to about 98.9° C. KOH was added to the water and Vinsol® was dissolved in solution. Asphalt was heated separately until fluid. Gum rosin was melted into the asphalt and mixed until uniform. The asphalt blend was mixed with the water blend in a colloid mill and stored in the vessel. The example asphalt emulsion was found to have a viscosity of 60 cps, 58.6% solids, and a pH of 12.5. Table 6 shows an example formulation for a complete asphalt emulsion.

TABLE 6

| Component | Amount (%) |
|---|---|
| Saponifying Agent (potassium hydroxide (KOH)) | 0.5 |
| Asphalt Component (0-penetration) | 57.02 |
| Emulsifier (Vinsol ® resin) | 1.08 |
| Gum Rosin | .29 |
| Water | 41.1 |

The table values correspond to the weight percent of each emulsion component unless otherwise specified.

A complete wax emulsion was formed using the following example method. Water was heated to about 93.3° C. KOH was added to the water and polyvinyl alcohol (PVOH) was dissolved in solution. Upon dissolution of the PVOH, SMA and Lignasulfonate were added and mixed until uniform. Separately, paraffin wax was heated until molten. Montan wax was then melted into the paraffin and mixed until uniform. The wax blend was mixed with the water blend in a colloid mill and stored in the vessel. The example wax emulsion was found to have a viscosity of 160 cps, 43.95% solids, and a pH of 11.62. Table 7 shows an example formulation for a complete wax emulsion.

TABLE 7

| Component | Amount (%) |
|---|---|
| Saponifying Agent (potassium hydroxide (KOH)) | 0.5 |
| Montan Wax | 2.4 |
| Paraffinic Hydrocarbon (Paraffin Wax (fully refined)) | 34.56 |
| Polyvinyl Alcohol (PVOH) | 1.86 |
| SMA1000MA | 1 |
| Lignasulfonate Liquid | 1.5 |
| Water | 58.18 |

The table values correspond to the weight percent of each emulsion component unless otherwise specified.

Sufficient water was added to the asphalt emulsion to reduce the solids content to 40%. The asphalt emulsion was then mixed into the wax emulsion, at a ratio of 30:70 (asphalt emulsion to wax emulsion), under agitation until uniform. The resulting asphalt/wax emulsion was found to have a viscosity of 32 cps, 41.97% solids, and a pH of 12.1. Moisture resistance, using National Gypsum Burlington Stucco and following the ASTM C473 testing method described above, was found to be 6.84%.

In the second and third examples, described above, aqueous asphalt/wax emulsions were formed along with lab-sized gypsum boards using such emulsions for testing. To achieve the above described moisture resistance, the quantity of aqueous asphalt/wax emulsion used was sufficient to form wallboard having about 44 lbs of aqueous asphalt/wax emulsion per thousand square feet (MSF).

While the above detailed description has shown, described, and pointed out novel features as applied to various embodiments, it will be understood that various omissions, substitutions, and changes in the form and details of the devices or algorithms illustrated can be made without departing from the spirit of the disclosure. For example, certain percentages and ratios of component ingredients have been described with respect to certain example embodiments; however, other percentages and ratios may be used. Certain process have been described, however other embodiments may include fewer or additional states. As will be recognized, certain embodiments of the inventions described herein can be embodied within a form that does not provide all of the features and benefits set forth herein, as some features can be used or practiced separately from others.

What is claimed is:

1. An aqueous wax emulsion for use in a gypsum formulation, comprising:
   about no less than 50 percent to about no more than 75 percent by weight of water;
   about no less than 10 percent to about no more than 40 percent by weight of a wax component comprising a montan wax;
   about no less than 5 percent to about no more than 15 percent by weight of a asphalt component; and
   about no less than 0.5 percent to about no more than 5 percent by weight of at least one emulsifier.

2. The aqueous wax emulsion according to claim 1, wherein the emulsion comprises about 70 percent by weight of water; about 21 percent by weight of the wax component; about 8 percent by weight of the asphalt component; and about 1 percent by weight of the at least one emulsifier.

3. The aqueous wax emulsion according to claim 1, wherein the wax component further comprises a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof and/or a paraffinic hydrocarbon.

4. The aqueous wax emulsion according to claim 1, wherein the wax component further comprises a paraffinic hydrocarbon.

5. The aqueous wax emulsion according to claim 1, wherein the wax component comprises a wax selected from the group consisting of a normal α-olefin wax, an olefin wax of a carbon chain length of about 20 or more carbon atoms that is modified by oxidizing and/or refining through distillation or stripping, natural or synthetic carnauba wax, palm wax, Fischer-Tropsch wax, bees wax, polyethylene wax, polymeric alkenes, oxidized polyethylene waxes, and mixtures, blends and derivatives thereof.

6. The aqueous wax emulsion according to claim 1, wherein the wax component comprises a paraffinic hydrocarbon and the paraffinic hydrocarbon is a paraffin wax having a melting point of about 40° C. to about 80° C.

7. The aqueous wax emulsion according to claim 6, wherein the paraffin wax comprises no more than about 1 percent by weight oil.

8. The aqueous wax emulsion according to claim 7, wherein the paraffin wax comprises no more than about 0.5 percent by weight oil.

9. The aqueous wax emulsion according to claim 1, wherein the emulsion comprises no less than about 0.5 to no more than about 5 percent by weight of a montan wax; no less than about 0.1 to no more than about 5 percent by weight of a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof; and no less than about 5 to no more than about 30 percent by weight of a paraffinic hydrocarbon.

10. The aqueous wax emulsion according to claim 1, wherein the emulsion comprises no less than about 1 to no more than about 4 percent by weight of a montan wax; no less than about 0.25 to no more than about 3 percent by weight of a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof; and no less than about 10 to about no more than 30 percent by weight of a paraffinic hydrocarbon.

11. The aqueous wax emulsion according to claim 1, wherein the emulsion comprises no less than about 1.5 to no more than about 3 percent by weight of a montan wax; no less than about 0.5 to no more than about 1.5 percent by weight of a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof; and no less than about 15 to about no more than 25 percent by weight of a paraffinic hydrocarbon.

12. The aqueous wax emulsion according to claim 1, wherein the emulsion comprises about 2 percent by weight of a montan wax; about 1 percent by weight of a wax selected from the group consisting of a normal α-olefin wax, an olefin wax of a carbon chain length of about 20 or more carbon atoms that is modified b oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof; and about 18 percent by weight of a paraffinic hydrocarbon.

13. The aqueous wax emulsion according to claim 1, wherein the wax component comprises a paraffinic hydrocarbon and wherein the ratio of the asphalt component to the paraffinic hydrocarbon is about 0.1:1 to about 1:1 by weight.

14. The aqueous wax emulsion according to claim 13, wherein the ratio of the asphalt component to the paraffinic hydrocarbon is about 0.4:1 by weight.

15. The aqueous wax emulsion according to claim 1, wherein the asphalt component has a penetration grade no more than about 60.

16. The aqueous wax emulsion according to claim 1, wherein the asphalt component has a penetration grade no more than about 20.

17. The aqueous wax emulsion according to claim 1, wherein the asphalt component has a penetration grade no less than about 0 to no more than about 10.

18. The aqueous wax emulsion according to claim 1, wherein the at least one emulsifier comprises a resin, a Kraft lignin, styrene maleic anhydride, and/or a polyolefin maleic grafted anhydride.

19. The aqueous wax emulsion according to claim 1, wherein the at least one emulsifier comprises a resin and/or a Kraft lignin.

20. The aqueous wax emulsion according to claim 19, wherein the resin comprises one or more of poly(phenolate carboxylate) resin, a hydrocarbon resin, a thermoplastic resin, and blends thereof, and wherein the Kraft lignin comprises a tall oil fatty acid based amidoamine and blends thereof.

21. The aqueous wax emulsion according to claim 20, wherein the emulsion comprises about 0.5 percent by weight of the poly(phenolate carboxylate) resin and about 0.6 percent by weight of the thermoplastic resin.

22. The aqueous wax emulsion according to claim 1, wherein the at least one emulsifier comprises styrene maleic acid and/or a polyolefin maleic grafted anhydride.

23. The aqueous wax emulsion according to claim 22, wherein the polyolefin maleic grafted anhydride is polyethylene grafted maleic anhydride.

24. The aqueous wax emulsion according to claim 1, further comprising a saponifying agent, wherein the emulsion comprises less than about 5 percent by weight of the saponifying agent.

25. The aqueous wax emulsion according to claim 1, further comprising a saponifying agent, wherein the emulsion comprises no less than about 0.1 percent by weight to no more than about 3 percent by weight of the saponifying agent.

26. The aqueous wax emulsion according to claim 25, wherein the emulsion comprises about 0.5 percent by weight of the saponifying agent.

27. The aqueous wax emulsion according to claim 26, wherein the saponifying agent is an alkali metal.

28. The aqueous wax emulsion according to claim 1, further comprising a stabilizer and/or a dispersant.

29. An aqueous wax emulsion for use in a gypsum formulation, comprising:
about no less than 50 percent to about no more than 75 percent by weight of water;
about no less than 10 percent to about no more than 40 percent by weight of a wax component;
about no less than 5 percent to about no more than 15 percent by weight of an asphalt component having a penetration grade no more than about 60; and
about no less than 0.5 percent to about no more than 5 percent by weight of at least one emulsifier.

30. The aqueous wax emulsion according to claim 29, wherein the emulsion comprises about 70 percent by weight of water; about 21 percent by weight of the wax component; about 8 percent by weight of the asphalt component; and about 1 percent by weight of the at least one emulsifier.

31. The aqueous wax emulsion according to claim 29, wherein the wax component comprises at least one of montan wax, a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof, and/or a paraffinic hydrocarbon.

32. The aqueous wax emulsion according to claim 29, wherein the wax component comprises a montan wax.

33. The aqueous wax emulsion according to claim 29, wherein the emulsion comprises no less than about 0.5 to no more than about 5 percent by weight of a montan wax; no less than about 0.1 to no more than about 5 percent by weight of a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof; and no less than about 5 to no more than about 30 percent by weight of a paraffinic hydrocarbon.

34. The aqueous wax emulsion according to claim 29, wherein the wax component comprises a paraffinic hydrocarbon and wherein the ratio of the asphalt component to the paraffinic hydrocarbon is about 0.1:1 to about 1:1 by weight.

35. The aqueous wax emulsion according to claim 29, wherein the at least one emulsifier comprises a resin, a Kraft lignin, styrene maleic anhydride, and/or a polyolefin maleic grafted anhydride.

36. The aqueous wax emulsion according to claim 29, further comprising a saponifying agent, wherein the emulsion comprises less than about 5 percent by weight of the saponifying agent.

37. The aqueous wax emulsion according to claim 29, further comprising a stabilizer and/or a dispersant.

38. An aqueous wax emulsion for use in a gypsum formulation, comprising:
about no less than 50 percent to about no more than 75 percent by weight of water;
about no less than 10 percent to about no more than 40 percent by weight of a wax component;
about no less than 5 percent to about no more than 15 percent by weight of an asphalt component; and
about no less than 0.5 percent to about no more than 5 percent by weight of at least one emulsifier comprising about 0.5 percent by weight of a poly(phenolate carboxylate) resin and about 0.6 percent by weight of a thermoplastic resin.

39. The aqueous wax emulsion according to claim 38, wherein the emulsion comprises about 70 percent by weight of water; about 21 percent by weight of the wax component; about 8 percent by weight of the asphalt component; and about 1 percent by weight of the at least one emulsifier.

40. The aqueous wax emulsion according to claim 38, wherein the wax component comprises at least one of montan wax, a wax selected from the group consisting of a normal α-olefin wax, an olefin wax of a carbon chain length of about 20 or more carbon atoms that is modified by oxidizing and/or refining through distillation or stripping, carnauba wax, palm wax, Fischer-Tropsch wax, bees wax, polyethylene wax, polymeric alkenes, oxidized polyethylene waxes, and mixtures, blends and derivatives thereof, and/or a paraffinic hydrocarbon.

41. The aqueous wax emulsion according to claim 38, wherein the wax component comprises a montan wax.

42. The aqueous wax emulsion according to claim 38, wherein the emulsion comprises no less than about 0.5 to no more than about 5 percent by weight of a montan wax; no less than about 0.1 to no more than about 5 percent by weight of a synthetic montan wax; and no less than about 5 to no more than about 30 percent by weight of a paraffinic hydrocarbon.

43. The aqueous wax emulsion according to claim 38, wherein the wax component comprises a paraffinic hydrocarbon and wherein the ratio of the asphalt component to the paraffinic hydrocarbon is about 0.1:1 to about 1:1 by weight.

44. The aqueous wax emulsion according to claim 38, wherein the at least one emulsifier comprises a resin, a Kraft lignin, styrene maleic anhydride, and/or a polyolefin maleic grafted anhydride.

45. The aqueous wax emulsion according to claim 38, further comprising a saponifying agent, wherein the emulsion comprises less than about 5 percent by weight of the saponifying agent.

46. The aqueous wax emulsion according to claim 38, further comprising a stabilizer and/or a dispersant.

47. An aqueous wax emulsion for use in a gypsum formulation, comprising:
  about no less than 50 percent to about no more than 75 percent by weight of water;
  about no less than 10 percent to about no more than 40 percent by weight of a wax component;
  about no less than 5 percent to about no more than 15 percent by weight of an asphalt component; and
  about no less than 0.5 percent to about no more than 5 percent by weight of at least one emulsifier comprising styrene maleic acid and/or polyolefin maleic grafted anhydride.

48. The aqueous wax emulsion according to claim 47, wherein the emulsion comprises about 70 percent by weight of water; about 21 percent by weight of the wax component; about 8 percent by weight of the asphalt component; and about 1 percent by weight of the at least one emulsifier.

49. The aqueous wax emulsion according to claim 47, wherein the wax component comprises at least one of montan wax, a synthetic montan wax, and/or a paraffinic hydrocarbon.

50. The aqueous wax emulsion according to claim 47, wherein the wax component comprises a montan wax.

51. The aqueous wax emulsion according to claim 47, wherein the emulsion comprises no less than about 0.5 to no more than about 5 percent by weight of a montan wax; no less than about 0.1 to no more than about 5 percent by weight of a synthetic montan wax; and no less than about 5 to no more than about 30 percent by weight of a paraffinic hydrocarbon.

52. The aqueous wax emulsion according to claim 47, wherein the wax component comprises a paraffinic hydrocarbon and wherein the ratio of the asphalt component to the paraffinic hydrocarbon is about 0.1:1 to about 1:1 by weight.

53. The aqueous wax emulsion according to claim 47, wherein the at least one emulsifier comprises a resin, a Kraft lignin, styrene maleic anhydride, and/or a polyolefin maleic grafted anhydride.

54. The aqueous wax emulsion according to claim 47, further comprising a saponifying agent, wherein the emulsion comprises less than about 5 percent by weight of the saponifying agent.

55. The aqueous wax emulsion according to claim 47, further comprising a stabilizer and/or a dispersant.

* * * * *

UNITED STATES PATENT AND TRADEMARK OFFICE
CERTIFICATE OF CORRECTION

| | |
|---|---|
| PATENT NO. | : 8,821,632 B2 |
| APPLICATION NO. | : 13/585719 |
| DATED | : September 2, 2014 |
| INVENTOR(S) | : Jonathan T. Stuart et al. |

It is certified that error appears in the above-identified patent and that said Letters Patent is hereby corrected as shown below:

In the Specification

In column 6 at line 7, Change "coliphonium" to --colophonium--.

In column 7 at line 56, Change "methylstryenated" to --methylstyrenated--.

In column 8 at line 7, Change "alkynl-," to --alkynyl-,--.

In column 8 at line 31, Change "napthalenes" to --naphthalenes--.

In column 8 at line 12, Change "alkynl-," to --alkynyl-,--.

In column 22 at line 47, Change "Lignasulfonate" to --Lignosulfonate--.

In column 22 at line 64 (approx.), Change "Lignasulfonate" to --Lignosulfonate--.

In the Claims

In column 24 at line 58, In Claim 12, change "b" to --by--.

Signed and Sealed this
Twelfth Day of May, 2015

Michelle K. Lee
*Director of the United States Patent and Trademark Office*